United States Patent

[11] 3,613,732

[72] Inventors: James R. Willson, Garden Grove; Keith T. Krueger, Garden Grove; Hugh J. Tyler, Santa Ana; Wilbur F. Jackson, Rolling Hills, all of Calif.
[21] Appl. No. 842,483
[22] Filed July 17, 1969
[45] Patented Oct. 19, 1971
[73] Assignee Robertshaw Controls Company, Richmond, Va.

[54] TEMPERATURE-RESPONSIVE VALVE OPERATORS
62 Claims, 19 Drawing Figs.

[52] U.S. Cl. ........................137/625.44, 251/11, 60/23
[51] Int. Cl. ........................F16k 31/00, F03g 7/06
[50] Field of Search........................251/11; 60/23; 137/625.44

[56] References Cited
UNITED STATES PATENTS
| | | | |
|---|---|---|---|
| 2,787,118 | 4/1957 | Markham | 251/11 X |
| 3,395,885 | 8/1968 | Kolze et al. | 251/11 |
| 3,403,238 | 9/1968 | Buehler et al. | 251/11 X |
| 3,465,962 | 9/1969 | Matulich et al. | 251/11 X |

FOREIGN PATENTS
| | | | |
|---|---|---|---|
| 843,991 | 4/1939 | France | 251/11 |

Primary Examiner—Arnold Rosenthal
Attorney—Anthony A. O'Brien

ABSTRACT: Temperature-responsive valve operators including a control member controlling the position of a valve member and constructed of a material having a temperature-actuated shape memory, the control member having an initial shape and a distorted shape, bias means biasing the valve member into a first position when the control member has the distorted shape, and temperature-controlling means for reverting the control member to the initial shape to move the valve member to a second position.

INVENTORS,
James R. Willson
Keith T. Krueger
Hugh J. Tyler
Wilbur F. Jackson

BY *Anthony A. O'Brien*
ATTORNEY

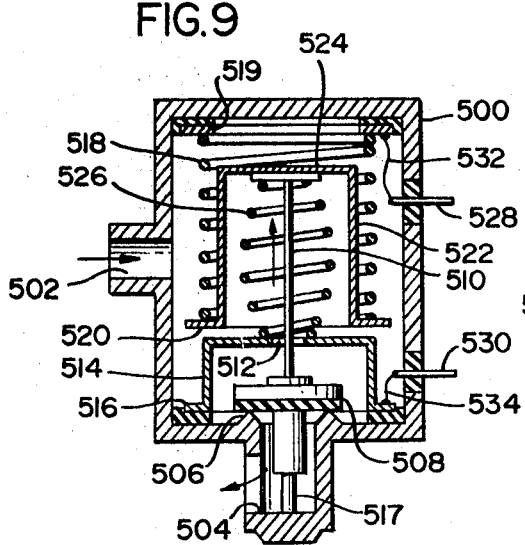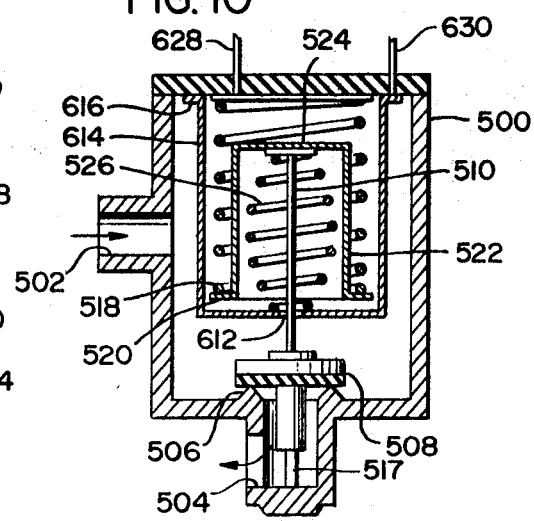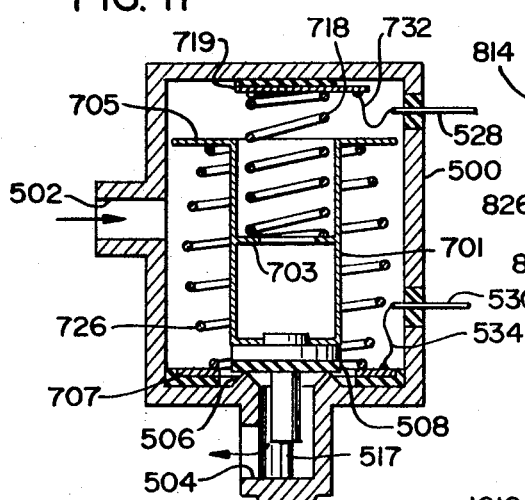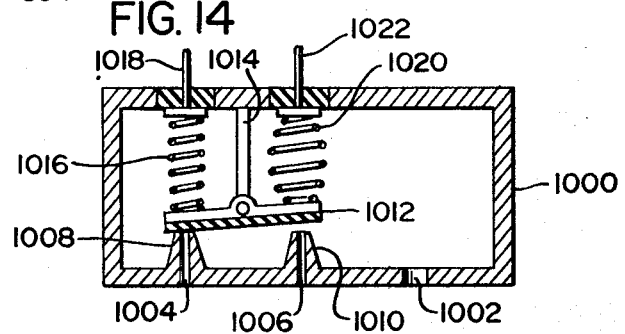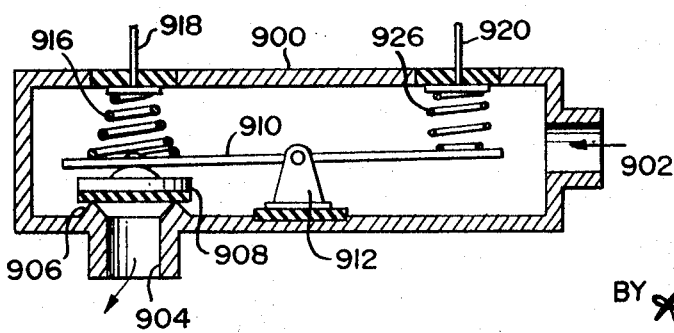

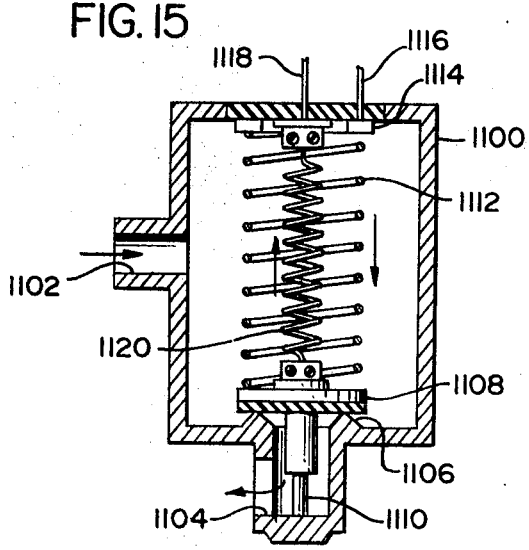
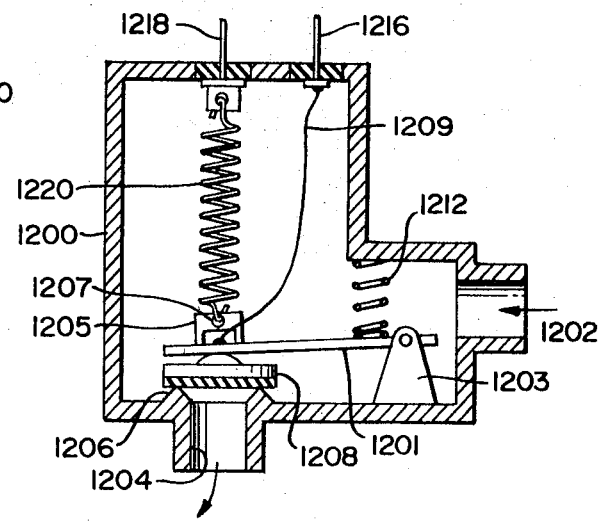
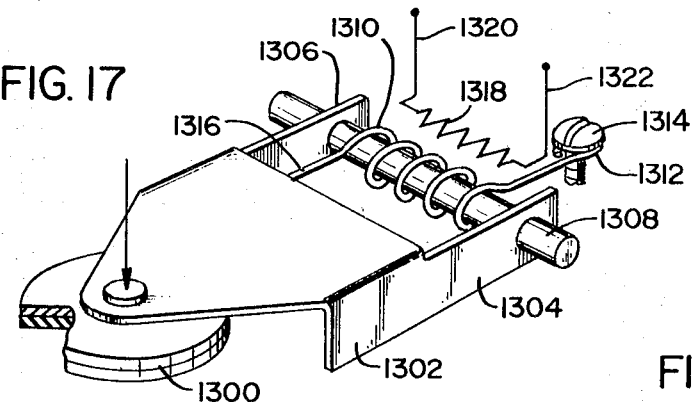
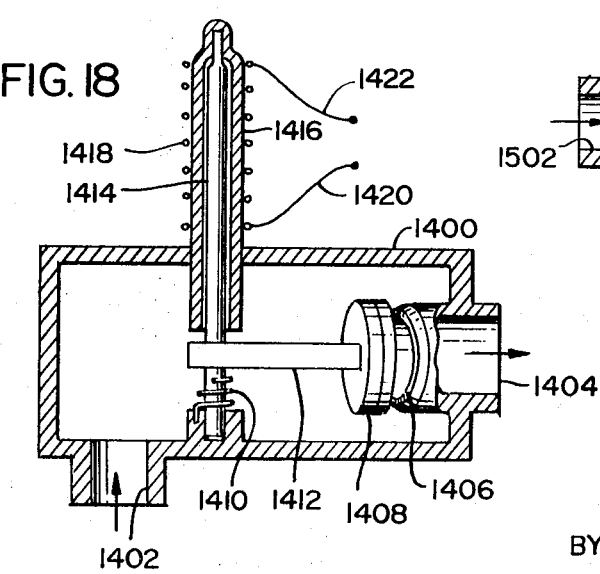
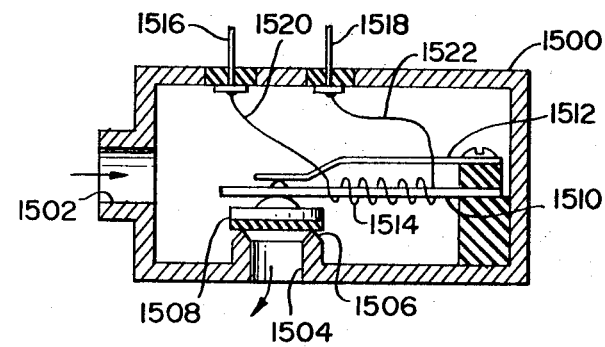

3,613,732

TEMPERATURE-RESPONSIVE VALVE OPERATORS

BACKGROUND OF THE INVENTION

The present invention pertains to temperature-responsive valve operators and more particularly to valve operators including a control member constructed of material having a modulus of elasticity varying with temperature to provide a temperature-actuated shape memory.

Many types of temperature-responsive operators have been used in the past to control the operation of valves. Such operators include bimetals, hydraulic bulbs and bellows, and expansible rods and tubes; however, all of these conventional operators have suffered from the same disadvantages. The major disadvantage in using conventional temperature responsive operations is that the amount of work obtained from the amount of energy normally supplied by way of heat is very low, thereby providing inefficient operation. Furthermore, conventional temperature-responsive operators have invariable shapes and cross sections and are not adaptable to new and varying valve structures.

Conventional temperature-responsive valve operators operate primarily by expansion and contraction. That is, in the case of a bimetal the varying coefficient of expansion of the two strips of metal secured to each other causes deflection of the bimetal; and, in the case of a rod and tube, the rod is constructed of a metal having a low coefficient of expansion and is secured at one end to the tube which has a much higher coefficient of expansion such that the rod is moved by the tube in response to temperature.

Since conventional temperature-responsive valve operators operate due to expansion and contraction of materials, they require ambient temperature compensation in order to prevent inaccurate and faulty operation of the valves. Complete ambient temperature compensation is difficult to provide; and, accordingly, the need for ambient temperature compensation is a distinct disadvantage.

SUMMARY OF THE INVENTION

It is an object of the present invention to construct an operator for a valve of a material having a temperature-actuated shape memory.

Another object of the present invention is to utilize a control member constructed of a material having a temperature-actuated shape memory to control a valve member such that when the temperature sensed by the control member changes the control member will revert to an initial shape to change the position of the valve member.

A further object of the present invention is to utilize a spring constructed of a material having a temperature-actuated shape memory to control the operation of a valve.

The present invention has another object in that a torsion control member constructed of a material having a temperature-actuated shape memory is utilized to control a valve.

Another object of the present invention is to utilize a wire constructed of a material having a temperature-actuated shape memory to control a valve.

Valve operators constructed in accordance with the present invention are advantageous over conventional valve operators in that a high work output is obtained for the amount of energy supplied to the valve operators by way of temperature change, the valve operators may be constructed for fail-safe operation such that a set in the valve operator or breakage of the valve operator returns the valve to its closed position, the valve operator may have many different shapes and cross sections, operation of the valve operators is silent, and no ambient temperature compensation is required for the valve operators.

The present invention is generally characterized in an operator for a valve including a valve member having a first position and a second position, means biasing the valve member toward the first position, operating means including a control member for controlling the position of the valve member, the control member having an initial shape and a distorted shape and being constructed of a material having a temperature-actuated shape memory, the valve member being in the first position when the control member has the distorted shape, in the second position when the control member has the initial shape and means controlling the temperature of the control member to control the shape of the control member.

Further objects and advantages of the present invention will become apparent from the description of the preferred embodiments as shown in the accompanying drawings.

BRIEF DESCRIPTION OF THE DRAWINGS

FIG. 9 is an elevational view in section of a further embodiment of the present invention.

FIGS. 10 and 11 are elevational views in section of modifications of the embodiment of FIG. 9.

FIG. 12 is an elevational view in section of another embodiment of the present invention.

FIGS. 13 and 14 are elevational views in section of modifications of FIG. 12.

FIG. 15 is an elevational view in section of a further embodiment of the present invention.

FIG. 16 is an elevational view in section of a modification of the embodiment of FIG. 15.

FIG. 17 is a perspective view of the operator portion of a further embodiment of the present invention.

FIG. 18 is an elevational view in section of another embodiment of the present invention.

FIG. 19 is an elevational view in section of a further embodiment of the present invention.

DESCRIPTION OF THE PREFERRED EMBODIMENTS

All of the embodiments of the present invention utilize control members constructed from a material having a temperature-actuated shape memory. By this is meant that a straight wire of such a material can be bent or contorted below its "martensitic" transition temperature and it will retain its deformed or distorted shape, but when the deformed wire is heated above its transition temperature with nothing constraining its movement such wire will spring back to its initial straight shape.

The transition temperature is represented by a rapid change in modulus on a modulus of elasticity vs. temperature curve. That is, as temperature decreases through the transition zone, the modulus of elasticity decreases. As temperature increases through the transition zone the modulus of elasticity increases. For the purposes of the invention of this disclosure, material with a relatively high transition temperature should be used. This will allow the shape memory material to cool to a temperature below its transition zone when used at normal operating ambient temperature. These operating ambients will generally be greater than room temperature.

Figure 1:
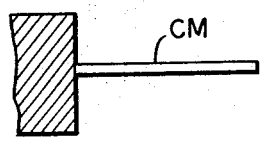
FIGS. 1, 2 and 3 are schematic drawings illustrating the general operation of control members constructed of material having a temperature-actuated shape memory.
Figure 2:
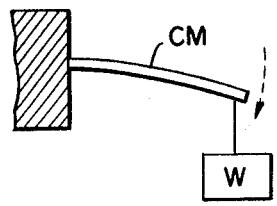
Figure 3:
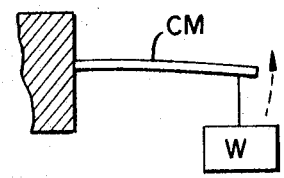

The shape memory characteristic may be further understood with reference to FIGS. 1, 2 and 3 which illustrate the general operation of a control member constructed of material having a temperature-actuated shape memory. In FIG. 1 a control member CM in the form of a rod is illustrated as extending horizontally from a vertical wall. The control member is annealed above the transition temperature such that it has the linear configuration illustrated in FIG. 1. The temperature is then dropped to normal room temperature which is below the transition temperature, and a weight W is attached to the end of control member CM. Since the modulus of elasticity is low at this temperature the weight W distorts control member CM, and the control member assumes its distorted shape as illustrated in FIG. 2. After heat is applied to control member CM, for instance by passing an electrical current therethrough or energizing a heating element adjacent thereto, control member CM tries to return to its linear configuration due to the increase in modulus of elasticity as the temperature is increased above the transition temperature thereby lifting weight W from the position shown in FIG. 2 to the position shown in FIG. 3. As shown in FIG. 3, control member CM assumes a slightly deflected intermediate shape, which is referred to as the initial shape for further operation. Once the temperature sensed by control member CM drops again to room temperature the decrease in the modulus of elasticity will permit the control member to return to its distorted shape as shown in FIG. 2. Thus, by the mere controlled application of heat, control member CM may have its shape controlled between the initial shape, as shown in FIG. 3, and the distorted shape, as shown in FIG. 2.

One of the great advantages of the present invention is that the material may be utilized to form control members having greatly varying shapes and cross sections, such as rods, flat bars, torsion bars, helical springs, flat springs, wave washers, spring washers, belleville springs, hairsprings, or wires, to name a few. Accordingly, the rod shown in FIGS. 1, 2 and 3 is utilized only to provide general understanding of the manner of operation of control members constructed of a material having a temperature-actuated shape memory, and it is clear that control members for use with the present invention may have any desired shape and cross section, as may be seen from the following description of the preferred embodiments.

The above description of materials useful with the present invention is provided for general background in order to aid in understanding the present invention. For specific information with respect to one such material, reference is made to U.S. Pat. No. 3,174,851 to Buehler et al. and U.S. Pat. No. 3,403,238 to Buehler et al. The above-cited patents are concerned with alloys formed of nickel and titanium; however, while an alloy having a composition of 55 percent nickel by weight with the remainder being essentially titanium may be used with the present invention, the present invention is not limited to these alloys but may utilize any materials having similar properties. That is, any material having a temperature-actuated shape memory or a modulus of elasticity that varies with temperature may be used with the present invention.

For purposes of clarity in the description of the preferred embodiments, the shape assumed by a loaded control member at a temperature above the transition temperature will be referred to as the initial shape and the shape assumed by the loaded control member at a temperature below the transition temperature will be referred to as the distorted shape.

Figure 4:
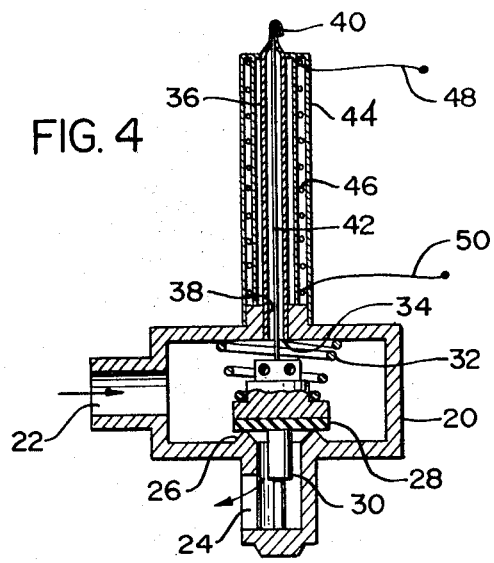
FIG. 4 is an elevational view in section of an embodiment of the present invention.

A first embodiment of the present invention is illustrated in FIG. 4 and includes a casing 20 for a valve assembly having an inlet 22, an outlet 24 and an annular valve seat 26 disposed therebetween. A valve member 28 is movably disposed for cooperation with valve seat 26 to control fluidic flow through casing 20. A conventional post valve guide 30 cooperates with a hollow bottom portion of valve member 28 in order to assure proper positioning of valve member 28, and a bias spring 32 is mounted in compression between the top of valve member 28 and an upper wall of casing 20.

Casing 20 has an annular opening 34 in the upper wall, and a thin-walled metal tubular housing 36 has an open lower end 38 sealably secured to opening 34. The upper end 40 of tube 36 has a gastight seal and securely fastens the top of a wire control member 42 having a straight distorted shape and constructed of a material having a temperature-actuated shape memory. The bottom of control member 42 is firmly secured to valve member 28 such that control member 42 is axially loaded and can move freely inside of tube 36.

A hollow sleeve 44 of a heating unit is disposed coaxially around tube 36, and a heating element 46 is coiled within the hollow portion of sleeve 44. A pair of leads 48 and 50 are connected with heating element 46 and are adapted to be connected with a suitable source of electricity.

In operation valve member 28 normally engages valve seat 26 due to the force from bias spring 32 to place the valve in the closed condition, as illustrated. Control member 42 is in its distorted shape at this time since no heat is being applied thereto. When it is desired to open the valve, electricity is supplied to leads 48 and 50, for instance by the closing of a switch such as a thermostat, to energize heating element 46. The heat generated by heating element 46 is transmitted through the thin walls of housing 36 and is sufficient to raise the temperature sensed by control member 42 such that the modulus of elasticity of control member 42 is raised to a point where the load constituted by spring 32 and the weight of valve member 28 is insufficient to distort control member 42 to the extent required to maintain the valve in the closed condition. Thus, control member 42 will revert to its initial shape thereby drawing valve member 28 away from valve seat 26 to open the valve. The initial shape of control member 42 may be merely a straight wire of shorter length than the length of control member 42 in its distorted shape, or the initial shape of control member 42 may include one or more loops or may have any other shape such that reversion to the initial shape causes a shortening of the effective end-to-end length of control member 42.

In the open condition the valve provides fail-safe operation in that should wire control member 42 break or set or should the electricity be interrupted for any reason the valve will return to the closed condition. That is, the force from bias spring 32 will cause valve member 28 to engage valve seat 26 if wire control member 42 is removed from its initial shape for any reason. Fail-safe operation is very important in systems where the fluid to be controlled is inherently dangerous, such as fuel for burner systems.

When it is desired to close the valve, heating element 46 is deenergized thereby lowering the temperature sensed by control member 42 and decreasing the modulus of elasticity. Once the modulus of elasticity has decreased such that the force from spring 32 and the weight of valve member 28 are sufficient to distort control member 42, the valve returns to the closed condition.

Figure 5:
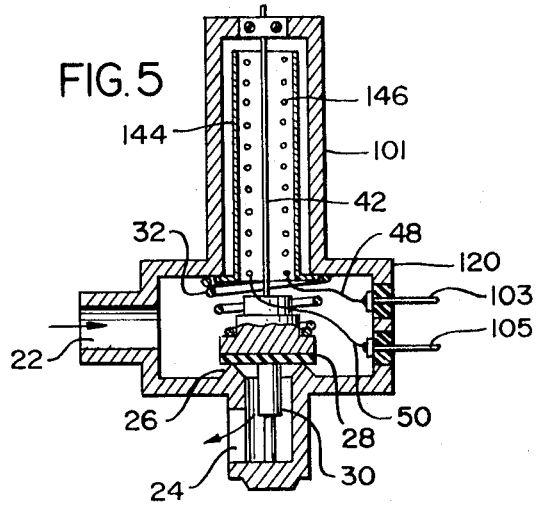
FIG. 5 is an elevational view in section of a modification of the embodiment of FIG. 4.

A modification of the embodiment of FIG. 4 is illustrated in FIG. 5. Parts in FIG. 5 identical to parts in FIG. 4 are given identical reference numbers, and similar parts are given reference numbers with 100 added.

A casing 120 for a valve assembly includes an inlet 22, an outlet 24 and an annular valve seat 26 disposed therebetween. A valve member 28 is movably disposed for cooperation with valve seat 26 to control fluidic flow through casing 120. A conventional post valve guide 30 cooperates with a hollow bottom portion of valve member 28 in order to assure proper positioning of valve member 28, and a bias spring 32 is mounted in compression between the top of valve member 28 and an upper wall of valve casing 120.

Casing 120 has an upstanding cylindrical housing 101 extending from the upper wall, and a wire control member 42 is securely fastened to the top of housing 101. A heating unit is disposed in housing 101 and secured at its bottom to the upper wall thereof. The heating unit includes a hollow sleeve 144 and a heating element 146 coiled therein coaxially with wire control member 42. Control member 42 has a straight distorted shape and is constructed of a material having a temperature-actuated shape memory. The bottom of control member 42 is firmly secured to valve member 28 such that control member 42 is axially loaded and can move freely inside housing 101. A pair of terminals 103 and 105 extend through gastight seals in a sidewall of casing 120 and are connected to heating element 146 through a pair of leads 48 and 50. Terminals 103 and 104 are adapted to be connected with a suitable source of electricity.

In operation valve member 28 normally engages valve seat 26 due to the force from bias spring 32 to place the valve in the closed condition, as illustrated. When it is desired to open the valve, electricity is supplied to leads 48 and 50 through terminals 103 and 105 to energize heating element 146. The heat from heating element 146 is effective to cause control member 42 to revert to its initial shape in the same manner as previously described with respect to the embodiment of FIG. 4 to draw valve member 28 away from valve seat 26 and open the valve.

Fail-safe operation is provided when the valve is in the open condition in the same manner as with the embodiment of FIG. 4.

As described with respect to the embodiment of FIG. 4, when it is desired to close the valve, heating element 146 is deenergized to cause control member 43 to cool and return to its distorted shape due to the force from spring 32 and the weight of valve member 28.

The primary difference in the embodiments of FIGS. 4 and 5 is that heating element 146 is in closer proximity to control member 42 in FIG. 5 than heating element 46 is to control member 42 in FIG. 4. Thus, the embodiment of FIG. 5 has greater sensitivity.

The embodiment of FIG. 4 has the advantage that the heating unit is disposed outside of the stream of fluid flowing through the valve to therefore eliminate the necessity of running electrical connections through gastight seals. Furthermore, the external location of the heating unit in the embodiment of FIG. 4 facilitates the changing of heating units to adapt the valve assembly of FIG. 4 for use with various systems having varying voltage requirements or types of operation.

Both the embodiments of FIG. 4 and 5 have the further advantage that the electrical resistance of control members 42 is not a factor in determining the size or length of control members 42 to provide optimum valve seat and load characteristics. Thus, only physical characteristics of control members 42 need be considered in the embodiments of FIGS. 4 and 5, and the electrical characteristics of control members 42 need not be considered. Furthermore, since the control members do not carry currents, the valves of FIGS. 4 and 5 may be utilized with various energizing voltages.

Figure 6:
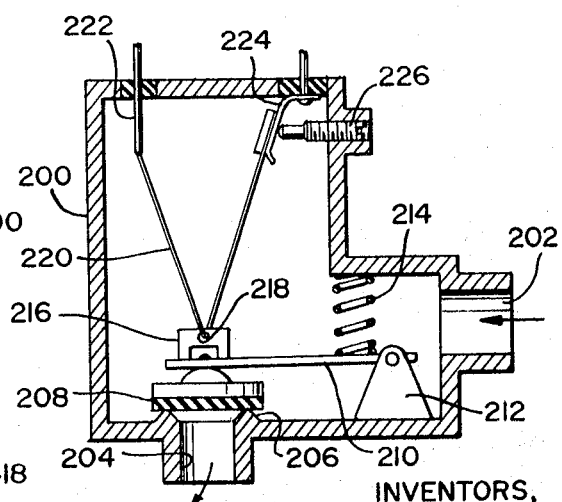
FIG. 6 is an elevational view in section of another embodiment of the present invention.

Another embodiment of the present invention is illustrated in FIG. 6 and includes a casing 200 for a valve assembly having an inlet 202, an outlet 204 and an annular valve seat 206 disposed therebetween. A valve member 208 is movably disposed for cooperation with valve seat 206 to control fluidic flow through casing 200. Value member 208 is firmly attached to the free end of a lever 210 which is secured at its other end to a fulcrum 212 that is secured to and insulated from a bottom wall of casing 200. A helical bias spring 214 is mounted in compression between lever 210 and an upper wall of valve casing 200. An inverted U-shaped connecting piece 216 is secured to the upper side of the free end of lever 210 and has a central aperture 218 therethrough.

A double strand wire control member 220 moves freely through aperture 218 and has one end firmly secured to an electrical terminal 222. The other end of wire control member 220 is secured to an L-shaped spring portion of an electrical terminal 224. Electrical terminals 222 and 224 extend through gastight seals in an upper wall of valve casing 200 and are adapted to be connected with a suitable source of electricity. Wire control member 220 is illustrated in its distorted shape and is constructed of a material having a temperature-actuated shape memory. An adjusting screw 226 threadedly engages a sidewall of valve casing 200 and has an end abutting spring terminal 224 in order to permit adjustment of the effective length of wire control member 220.

The valve of FIG. 6 is illustrated in the normally closed condition with valve member 208 engaging valve seat 206 due to the force from bias spring 214 and wire control member 220 in its distorted shape since no heat is being applied thereto. When it is desired to open the valve, electricity is supplied to terminals 222 and 224 such that a current is conducted by wire control member 220. The current passing through wire control member 220 internally generates sufficient heat to raise the temperature above the transition temperature to increase the modulus of elasticity. Wire control member 220 will revert to its initial shape once the modulus of elasticity has been increased to a point where the load constituted by the force from spring 214 and the weight of valve member 208 and lever 210 is insufficient to distort wire control member 220 to the extend required to maintain the valve in the closed condition. Wire control member 220 may have any desired initial shape with the requirement that when the material is above its transition temperature the effective length between terminals 222 and 224 and aperture 218 is shortened such that valve member 208 is lifted from valve seat 206 due to the action of wire control member 220 on lever 212. Wire control member 220 moves freely through aperture 218 in order to evenly distribute forces on either length of double strand wire member 220.

Fail-safe operation in the open condition is provided in the same manner as discussed with respect to the embodiment of FIG. 4 in that the valve will close if wire control member 220 breaks or sets or if the electricity is interrupted.

When it is desired to close the valve, the supply of electricity to terminals 222 and 224 is interrupted thereby reducing the temperature sensed by wire control member 220 and decreasing the modulus of elasticity. Once the modulus of elasticity has decreased such that the force from spring 214 and the weight of valve member 208 and lever 210 are sufficient to distort wire control member 220, the valve returns to the closed condition.

Figure 7:
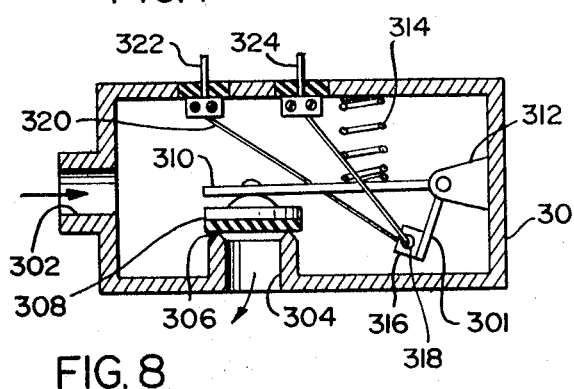
FIG. 7 and 8 are elevational views in section of modifications of the embodiment of FIG. 6.

A modification of the embodiment of FIG. 6 is illustrated in FIG. 7. Parts in FIG. 7 which are similar to parts of the embodiment of FIG. 6 are given the same reference numerals with 100 added.

A casing 300 for a valve assembly has an inlet 302, an outlet 304 and an annular valve seat 306 disposed therebetween. A valve member 308 is movably disposed for cooperation with valve seat 306 to control fluidic flow through casing 300. A lever 310 has its free end securely fastened to valve member 308 and has an acutely angled arm 301 extending therefrom. The juncture of arm 301 and lever 310 is secured to a fulcrum 312 that is secured to and insulated from a sidewall of casing 300. A helical bias spring 314 is disposed in compression between an upper wall of valve casing 300 and lever 310.

A double strand wire control member 320 has its ends firmly secured to a pair of electrical terminals 322 and 324 and moves freely through an aperture 318 in a connecting piece 316 which is secured to the free end of arm 301.

The embodiment of FIG. 7 is illustrated in the normally closed condition with valve member 308 engaging valve seat 306 due to the force from bias spring 314 and wire control member 220 in its distorted shape. When it is desired to open the valve, electricity is supplied to terminals 322 and 324 such that a current passes through wire control member 320 to internally generate heat. The heat raises the modulus of elasticity of control member 320 such that control member 320 reverts to its initial shape in the same manner as previously described with respect to the embodiment of FIG. 6. The reversion of control member 320 to its initial state pulls arm 301 toward terminals 322 and 324 to rotate lever 310 about fulcrum 314 in a clockwise direction, move valve member 308 away from valve seat 306 and open the valve. Wire control member 320 may have any desired initial shape with the requirement that upon reversion to the initial shape the effective length between terminals 322 and 324 and aperture 316 is shortened.

Fail-safe operation is obtained in the same manner as described with respect to the embodiment of FIG. 6.

When it is desired to close the valve, the supply of electricity to terminals 322 and 324 is interrupted. Accordingly, control member 320 cools with the reduction in temperature and the modulus of elasticity decreases such that the force from spring 314 and the weight of valve member 308 and lever 310 return control member 320 to its distorted shape to close the valve.

Figure 8:
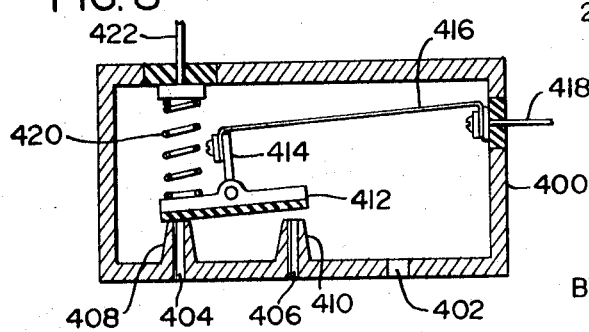

Another modification of the embodiment of FIG. 6 is illustrated in FIG. 8 and includes a casing 400 for a valve assembly having a flow port 402 and a pair of alternately controlled flow ports 404 and 406. A pair of valve seats 408 and 410 are associated with flow ports 404 and 406, respectively, and protrude from the bottom wall of casing 400. A valve member 412 cooperates with valve seats 408 and 410 to control flow between flow port 402 and flow ports 404 and 406. Valve member 412 has an upstanding arm 414 rigidly secured thereto, and a wire control member 416 has one end attached to the top of arm 414 and the other end attached to an electrical terminal 418 which extends through a gastight seal in a sidewall of casing 400. A helical bias spring 420 is mounted in compression between the upper side of valve member 412 overlying valve seat 408 and an electrical terminal 422 which extends through a gastight seal in an upper wall of casing 400.

In the deactuated condition the valve of FIG. 8 is as illustrated. That is, valve member 412 abuts valve seat 408 to close flow port 404 and permit flow between flow port 402 and flow port 406. Upon the application of electricity to electrical terminals 418 and 422, a current is passed through control member 416, arm 414, valve member 412 and spring 420 such that control member 416 generates internal heat to raise its modulus of elasticity as previously described with respect to the embodiment of FIG. 6. When the modulus of elasticity of control member 416 is sufficiently large such that the force of spring 420 is insufficient to maintain control member 416 in its distorted shape, control member 416 reverts to its initial shape such that the right side of valve member 412 cooperates with valve seat 410 to close flow port 406, and the fulcrum action of valve member 412 on valve seat 410 moves the left side of valve member 412 away from valve seat 408 to open flow port 404 and permit flow between flow port 404 and flow port 402. Control member 146 may have any desired initial shape with the criterion being that the distance between arm 414 and terminal 418 be shortened sufficiently when the material temperature is raised above its transition temperature to permit operation of the valve. The resistance of bias spring 420 should be sufficiently low to permit essentially all of the heating to take place in wire control member 416.

The valve assembly is fail-safe in the actuated condition in that bias spring 420 will return valve member 412 to the position engaging valve seat 408 if wire control member 416 should break or set or the electricity should be interrupted.

Once the electrical energy is removed from terminals 418 and 422, the cooling of control member 416 causes a reduction in the modulus of elasticity, and the force from spring 420 operates to return control member 416 to its distorted shape whereby the valve returns to the normal deactuated condition.

The embodiments of FIGS. 6, 7 and 8 have the advantage of being extremely sensitive while doing a large amount of work since the control member serves as a current carrying element. Thus, small operating currents may be utilized to permit the control member to internally generate heat. The embodiments of FIGS. 6 and 7 are particularly advantageous because the use of the double strand wire control member permits the electrical terminals and all electrical connections to be placed on the same side of the casing and also provides a long wire with higher resistance and voltage ratings than a single strand wire control member having the same load carrying capacity. The embodiment of FIG. 8 has the advantage of being operable with very little electrical power while being extremely sensitive, and the small amount of work required of the valve of FIG. 8 permits the use of an extremely small diameter single strand wire control member.

The embodiments of FIGS. 4 and 5 may be modified to operate with lever action as illustrated in the embodiments of FIGS. 6, 7 and 8. Similarly, the embodiments of FIGS. 6, 7 and 8 may be modified to provide direct lifting of valve members with appropriate valve guide means as illustrated in the embodiments of FIGS. 4 and 5.

A further embodiment of the present invention is illustrated in FIG. 9 and includes a casing 500 for a valve assembly having an inlet 502, an outlet 504 and an annular valve seat 506 disposed therebetween. A valve member 508 is movably disposed for cooperation with valve seat 506 to control fluidic flow through casing 500, and a valve stem 510 is attached to the top of valve member 508 and extends through a central aperture 512 in a cylindrical housing 514 which is secured to and insulated from a lower wall of casing 500 at a flange 516. A conventional post valve guide 517 cooperates with a hollow bottom portion of valve member 508 to assure proper positioning thereof.

A helical bias spring 518 is mounted in compression between a conductive ring 519 secured to and insulated from an upper wall of casing 500 and a flange 520 of a cylindrical spring seat 522 which has a top portion 524 attached to valve stem 510. A coiled spring control member 526 is mounted in compression between the top of housing 514 and top portion 524 of seat 522. A pair of electrical terminals 528 and 530 extend through gastight seals in a sidewall of valve casing 500 and are adapted to be connected to a suitable source of electricity. A lead 532 connects terminal 528 to ring 519 and a lead 534 connects terminal 530 with flange 516 of housing 514.

Spring control member 526 is constructed of a material having a temperature actuated shape memory and is illustrated in FIG. 9 in its tightly coiled barrellike distorted shape. The initial shape of spring control member 526 is loosely coiled such that when spring control member 526 reverts to its initial shape it pushes seat 522 away from housing 514 to lift valve member 508 from valve seat 506. The barrellike shape of spring control member 526 minimizes stress at the ends where the load carrying capacity of the spring control member is less due to the fact that the ends of the spring control member will heat less than the center. It is noted, however, that other shapes of compression springs may be used with the embodiment of FIG. 9.

The embodiment of FIG. 9 is illustrated with the valve in the closed condition and spring control member 526 in its distorted shape. When it is desired to open the valve, electricity is applied to terminals 528 and 530 to cause a current to flow through lead 532, ring 519, spring 518, seat 522, spring control member 526, housing 514 and lead 534 such that spring control member 526 internally generates heat to cause the modulus of elasticity of spring control member 526 to increase once the temperature rises above the transition temperature. Once the modulus of elasticity increases to a point where the load, constituted by the force of spring 518 and the weight of valve member 508, valve stem 510 and seat 522, is insufficient to distort spring control member 526 to the extent required to maintain valve member 508 in the closed position, spring control member 526 will revert to its initial shape to push seat 522 up and lift valve member 508 from valve seat 506.

In the open condition the valve assembly is fail-safe in that, if spring control member 526 breaks or sets or the electricity is interrupted, bias spring 518 will close the valve by forcing valve member 508 into engagement with valve seat 506.

To close the valve, the electricity supplied to terminals 528 and 530 is interrupted which lowers the temperature of spring control member 526. The cooling of spring control member 526 decreases the modulus of elasticity until the force from spring 518 and the weight of valve member 508, valve 510 and seat 522 are sufficient to change spring control member 526 to its tightly coiled distorted shape to close the valve.

A modification of the embodiment of FIG. 9 is illustrated in FIG. 10. Parts in FIG. 10 identical to parts in FIG. 9 are given identical reference numerals, and similar parts are given reference numerals with 100 added.

A casing 500 for a valve assembly includes an inlet 502, an outlet 504 and an annular valve seat 506 disposed therebetween. A valve member 508 is movably disposed for cooperation with valve seat 506 to control fluidic flow through casing 500, and a valve stem 510 is attached to the top of valve member 508 and extends through a central aperture 612 in a cylindrical housing 614 which is secured to and insulated from an upper wall of casing 500 at a flange 616. A post valve guide 517 cooperates with a hollow bottom portion of valve member 508 to assure proper positioning thereof.

A helical bias spring 518 is mounted in compression between an upper wall of casing 500 and a flange 520 of a cylindrical spring seat 522 which has a top portion 524 attached to valve stem 510. A coiled spring control member 526 is mounted in compression between the bottom of housing 614 and top portion 524 of seat 522. A pair of electrical terminals 628 and 630 extend through gastight seals in the top wall of valve casing 500 and are electrically connected to bias spring 518 and housing 614, respectively. Terminals 628 and 630 are adapted to be connected to a suitable source of electricity.

Spring control member 526 has a barrellike tightly coiled distorted shape and a barrellike coiled initial shape, and has the advantages mentioned with respect to the embodiment of FIG. 9. Of course, various configurations of compression springs could be utilized.

The embodiment of FIG. 10 is illustrated with the valve in the closed condition and spring control member 526 in its distorted shape. When it is desired to open the valve, electricity is supplied to terminals 628 and 630 to cause a current to flow through spring 518, seat 522, spring control member 526 and housing 614 such that spring control member 526 internally generates heat. When the modulus of elasticity of spring control member 526 increases to a point where it overcomes the load constituted by the force from spring 518 and the weight of valve member 508, valve stem 510 and seat 522, spring control member 526 reverts to its initial shape to push seat 522 up and lift valve member 508 to open the valve. Fail-safe operation is provided in the same manner as described with respect to FIG. 9.

To close the valve the electricity supplied to terminals 628 and 630 is interrupted which causes spring control member 526 to cool and return to its distorted tightly coiled shape to close the valve in the same manner as described with respect to the embodiment of FIG. 9.

Another modification of the embodiment of FIG. 9 is illustrated in FIG. 11. Parts in FIG. 11 identical to parts in FIG. 9 are given identical reference numerals and similar parts are given reference numerals with 200 added.

A casing 500 for a valve assembly has an inlet 502, an outlet 504 and an annular valve seat 506 disposed therebetween. A valve member 508 is movably disposed for cooperation with valve seat 506 to control fluidic flow through casing 500, and a post valve guide 517 cooperates with a hollow bottom portion of valve member 508 to assure proper positioning thereof. A cylindrical spring seat 701 is firmly secured to valve member 508 and has a central inner flange 703 and an upper outer flange 705. A helical bias spring 718 is mounted in compression between central inner flange 703 and an electrically conductive planar spring seat 719 secured to and insulated from an upper wall of casing 500. A coiled spring control member 726 is mounted in compression between top outer flange 705 and an electrically conductive ring 707 secured to and insulated from a bottom wall of casing 500. A pair of electrical terminals 528 and 530 extend through gastight seals in a sidewall of casing 500 and are adapted to be connected to a suitable source of electricity. A lead 732 connects terminal 528 with seat 719, and a lead 734 connects terminal 530 with ring 707.

Spring control member 726 has a barrellike configuration with a tightly coiled distorted shape and a loosely coiled initial shape similar to but larger than spring control member 526 of the embodiment of FIG. 9 with the same advantages. Of course, various other configurations of compression springs may be utilized.

The embodiment of FIG. 11 is illustrated with the valve in the closed condition and spring control member 726 in its distorted shape. When it is desired to open the valve, electricity is supplied to terminals 528 and 530 through lead 732, seat 719, spring 718, frame 701, spring control member 726, ring 707 and lead 734 such that spring control member 726 internally generates heat. When the modulus of elasticity of spring control member 726 increases to a point where it overcomes the load constituted by the force of spring 718 and the weight of valve member 508 and frame 701, spring control member 726 reverts to its initial shape to push frame 701 up such that valve member 508 is lifted from valve seat 506 to open the valve. Fail-safe operation is provided in the same manner as described with respect to FIG. 9.

To close the valve the electricity supplied to terminals 728 and 730 is interrupted which causes spring control member 726 to cool and return to its distorted shape to close the valve in the same manner as described with respect to the embodiment of FIG. 9.

The bias springs in the embodiments of FIGS. 9, 10 and 11 need not necessarily be part of the current path between terminals; however, when they are part of the current path as illustrated in FIGS. 9, 10 and 11, the bias springs should have a low enough resistance so that all of the heating takes place in spring control members.

The embodiments of FIGS. 9, 10 and 11 have the advantage that the spring control members are coaxially aligned with the valve members to directly lift the valve members from the valve seats. Another advantage is that the spring control members are coiled to make better use of the internally generated heat and reduce power requirements.

Another embodiment of the present invention is illustrated in FIG. 12 and includes a casing 800 for a valve assembly having an inlet 802, an outlet 804 and an annular valve seat 806 disposed therebetween. A valve member 808 is movably disposed for cooperation with valve seat 806 to control fluidic flow through casing 800. Valve member 808 is secured to a lever 810 that has one end pivotal about a fulcrum 812 and an offset end 814. A coiled bias spring 816 is disposed directly over valve member 808 and mounted in compression between lever 810 and an electrical terminal 818 extending through a gastight seal in an upper wall of valve casing 800. An electrical terminal 820 extends through a gastight seal in the upper wall of valve casing 800 and is connected through a load 822 to a conductive ring 824 which is secured to and insulated from a bottom wall of casing 800.

A coiled spring control member 826 is mounted in compression between offset end 814 of lever 810 and ring 824 and is illustrated in its barrellike tightly coiled distorted shape. The initial shape of spring control member 826 is barrellike and loosely coiled such that when spring control member 826 reverts to its initial shape it pushes offset end 814 of lever 810 up to pivot lever 810 about fulcrum 812 and lift valve member 808 from valve seat 806 to open the valve. Of course, various configurations of compression springs may be utilized.

The embodiment of FIG. 12 is illustrated with the valve in the closed condition and spring control member 826 in its distorted shape. When it is desired to open the valve, electricity is applied to terminals 818 and 820 to cause a current to flow through spring 816, lever 810, spring control member 826, spring seat 824 and lead 822 such that spring control member 826 internally generates heat to cause the modulus of elasticity of spring control member 826 to increase once the temperature rises above the transition temperature. Once the modulus of elasticity increases to a point where the load constituted by the force of spring 816 and the weight of valve member 808 and lever 810 is insufficient to distort spring control member 826 to the extend required to maintain valve member 808 in its closed position, spring control member 826 will revert to its initial shape to pivot lever 810 and lift valve member 808 from valve seat 806 to open the valve. Fail-safe operation is provided when the valve assembly is in the open condition since spring 816 will force valve member 808 into engagement with valve seat 806 to close the valve should spring control member 826 break or set or should the electricity be interrupted.

To close the valve the electricity supplied to terminals 818 and 820 is interrupted which lowers the temperature of spring control member 826. The cooling of spring control member 826 decreases the modulus of elasticity until the force from spring 816 and the weight of valve member 808 and lever 810 are sufficient to change spring control member 826 to its distorted shape to close the valve.

A modification of the embodiment of FIG. 12 is illustrated in FIG. 13 and parts in FIG. 13 similar to parts in FIG. 12 are given the same reference numerals with 100 added.

A casing 900 for a valve assembly includes an inlet 902, an outlet 904 and an annular valve seat 906 disposed therebetween. A valve member 908 is movably disposed for cooperation with valve seat 906 to control fluidic flow through casing 900. Valve member 908 is secured to one end of a lever 910 which is pivotally attached near its center to a fulcrum 912 that is secured to and insulated from a bottom wall of casing 900. A coiled bias spring 916 is disposed directly over valve member 908 and is mounted in compression between lever 910 and an electrical terminal 918 extending through a gastight seal in an upper wall of casing 900. A coiled spring control member 926 is mounted in compression between the other end of lever 910 and an electrical terminal 920 extending through a gastight seal in the upper wall of casing 900.

Spring control member 926 has a barrel like configuration with a tightly coiled distorted shape and a loosely coiled initial shape. Of course, various configurations of compression springs may be utilized.

The embodiment of FIG. 13 is illustrated with the valve assembly in the closed condition and spring control member 926 in its distorted shape. When it is desired to open the valve, electricity is supplied to terminals 918 and 920 to cause a current to flow through spring 916, lever 910 and spring control member 926 such that spring control member 926 internally generates heat. When the modulus of elasticity of spring control member 926 increases to a point where it overcomes the load constituted by the force of spring 916 and the weight of valve member 908, spring control member 926 reverts to its initial shape to pivot lever 910 clockwise to lift valve member 908 from valve seat 906 and open the valve. Fail-safe operation is provided in the same manner as described with respect to the embodiment of FIG. 12.

To close the valve the electricity supplied to terminals 918 and 920 is interrupted which causes spring control member 926 to cool and return to its distorted shape to close the valve in the same manner as described with respect to the embodiment of FIG. 12.

Another modification of the embodiment of FIG. 12 is illustrated in FIG. 14 and includes a casing 1000 for a valve assembly having a flow port 1002, and a pair of alternately controlled flow ports 1004 and 1006. A pair of valve seats 1008 and 1010 protrude from a bottom wall of casing 100 and are associated with flow ports 1004 and 1006, respectively, A valve member 1012 is movably disposed for cooperation with valve seats 1008 and 1010 to control flow through flow ports 1004 and 1006. Valve member 1012 is rigidly supported at its center by a support 1014 securely fastened to a top wall of casing 1000. A helical bias spring 1016 is mounted in compression between an electrical terminal 1018, which extends through a gastight seal in the upper wall of valve casing 1000, and the side of valve member 1012 overlying valve seat 1008. A coiled spring control member 1020 is mounted in compression between an electrical terminal 1022 which extends through a gastight seal in the upper wall of casing 1000 and the side of valve member 1012 overlying valve seat 1010.

Spring control member 1020 has a barrel like configuration with a tightly coiled distorted shape and a loosely coiled initial shape. Of course, various configurations of compression springs may be utilized.

The embodiment of FIG. 14 is illustrated in its deactuated condition with flow between flow port 1002 and flow port 1006 and with spring control member 1020 in its distorted shape. In order to actuate the valve assembly, electricity is supplied to terminals 1018 and 1022 to cause a current to flow through spring 1016, valve member 1012 and spring control member 1020 such that spring control member 1020 internally generates heat. When the modulus of elasticity of spring control member 1020 increases to a point where it overcomes the load constituted by the force of spring 1016, spring control member 1020 reverts to its initial shape to pivot valve member 1012 clockwise about support 1014 to cause valve member 1012 to engage valve seat 1010 and to be moved away from valve seat 1008. Thus, the flow path through valve casing 1000 is switched from flow port 1006 to 1004. Fail-safe operation is provided in essentially the same manner as described with respect to FIG. 12.

To return the valve to its normal deactuated condition, the electricity supplied to terminals 1018 and 1022 is interrupted which causes spring control member 1020 to cool and return to its distorted shape in the manner described with respect to the embodiment of FIG. 12.

As previously mentioned, the bias spring of embodiments of FIGS. 12, 13 and 14 need not necessarily be part of the current path through the valve assemblies; however, when they are part of the current path, as illustrated in FIGS. 12, 13 and 14, the bias springs should have a low enough resistance so that all of the heating takes place in the spring control members.

The embodiments of FIGS. 12, 13 and 14 have the advantage of better heating due to the coiling of the spring control members and their barrel like configurations.

A further embodiment of the present invention is illustrated in FIG. 15 and includes a casing 1100 for a valve assembly having an inlet 1102, an outlet 1104 and an annular valve seat 1106 disposed therebetween. A valve member 1108 is movably disposed for cooperation with valve seat 1106 to control fluidic flow through casing 1100. A post valve guide 1110 cooperates with a hollow bottom portion of valve member 1108 to assure proper positioning thereof. A helical bias spring 1112 is mounted in compression between valve member 1108 and a conductive ring 1114 firmly secured to a top wall of casing 1100. An electrical terminal 1116 is electrically connected with ring 1114 and extends through a gastight seal in the upper wall of valve casing 1110. An electrical terminal 1118 extends through a gas tight seal in the upper wall of valve casing 1100 and is secured to one end of a coiled spring control member 1112 which has its other end fastened to valve member 1108.

Spring control member 1120 is helical and is disposed in tension, as illustrated in FIG. 15. Spring control member 1120 has a loosely coiled distorted shape and a tightly coiled initial shape such that when spring control member 1120 reverts to its initial shape it lifts valve member 1108 from valve seat 1106 against the force of spring 1112. Of course, various configurations of tension springs may be utilized, such as flat springs.

The embodiment of FIG. 15 is illustrated with the valve assembly in the closed condition and spring control member 1120 in its distorted shape. When it is desired to open the valve, electricity is applied to terminals 1116 and 1118 to cause a current to flow through ring 1114, spring 1112, valve member 1108 and spring control member 1120 such that spring control member 1120 internally generates heat to cause the modulus of elasticity of spring control member 1120 to increase after the temperature rises above the transition temperature. Once the modulus of elasticity increases to a point where the load constituted by spring 1112 and the weight of valve member 1108 is insufficient to distort valve member 1120 to the extent required to maintain valve member 1108 in its closed position, spring control member 1120 will revert to its initial tightly coiled shape to life valve member 1108 and open the valve.

As previously described with respect to the embodiment of FIG. 9, bias spring 1112 need not necessarily be part of the current path through the valve assembly; however, when it is part of the current path as illustrated in FIG 15, bias spring 1112 should have a low enough resistance so that all of the heating takes place in spring control member 1120.

Operation of the valve assembly is fail-safe in that should spring control member 1120 break or set or should the electricity be interrupted, bias spring 1112 will push valve member 1108 down to engage valve seat 1106 and close the valve.

To close the valve the electricity supplied to terminals 1116 and 1118 is interrupted which lowers the temperature of spring control member 1120. The cooling of spring control member 1120 decreases the modulus of elasticity until the force from bias spring 1112 and the weight of valve member 1108 are sufficient to change spring control member 1120 to its distorted shape to close the valve.

A modification of the embodiment of FIG. 15 is illustrated in FIG. 16 and parts in FIG. 16 similar to parts in FIG. 15 are given the same reference numerals with 100 added.

A casing 1200 for a valve assembly includes an inlet 1202, an outlet 1204 and a valve seat 1206 disposed therebetween. A valve member 1208 is movably disposed for cooperation with valve seat 1206 to control fluidic flow through casing 1200. Valve member 1208 is secured to the free end of a lever 1201 which is pivotally secured to a fulcrum 1203. A helical bias spring 1212 is mounted in compression between lever 1201 and an upper wall of casing 1200. An inverted U-shaped connecting piece 1205 is secured to lever 1201 directly above valve member 1208 and has an aperture 1207 therein for receiving an end of a coiled spring control member 1220. Spring control member 1220 is mounted in tension and has its other end connected to an electrical terminal 1218 which extends through a gastight seal in an upper wall of casing 1200. An electrical terminal 1216 extends through a gastight seal in the upper wall of casing 200 and is electrically connected with piece 1205 through a lead 1209.

Spring control member 1220 has a helical configuration with tightly coiled initial shape and a loosely coiled distorted shape. Of course, various configurations of tension springs may be utilized, such as flat springs.

The embodiment OF FIG. 16 is illustrated with the valve assembly in the closed condition and spring control member 1220 in its distorted shape. When it is desired to open the valve, electricity is supplied to terminals 1216 and 1218 to cause a current to flow through lead 1209, connecting piece 2205 and spring control member 1220 such that spring control member 1220 internally generates heat. When the modulus of elasticity of spring control member 1220 increase to a point where it overcomes the load constituted by the force of spring 1212 and the weight of valve member 1208 and lever 1201, spring control member 1220 reverts to its tightly coiled initial shape to pivot lever 1201 clockwise about fulcrum 1203 to lift valve member from valve seat 1206 and open the valve. Fail-safe operation is provided in the same manner as provided in the embodiment of FIG. 15.

To close the valve the electricity supplied to terminals 1216 and 1218 is interrupted which causes spring control member 1220 to cool and return to its loosely coiled distorted shape to close the valve in the same manner as described with respect to the embodiment of FIG. 15.

The spring control members of FIGS. 15 and 16, which are mounted in tension, provide more of a snap action than the spring control members of FIGS. 9 through 14, which are mounted in compression. The reason that faster action is provided is that the radiant heat between adjacent coils becomes greater as the control member becomes more tightly coiled and smaller as the control member becomes more loosely coiled. Thus, if snap action is desired, a spring control member mounted in tension such as to have a tightly coiled initial shape may be utilized; and, if a slower action is desired, a spring control member mounted in compression such as to have a loosely coiled initial shape may be utilized.

A further embodiment of the present invention is illustrated in FIG. 17, which is a perspective view of a valve operator isolated from the valve casing to facilitate an understanding thereof. A valve member 1300, which is adapted to movably cooperate with a valve seat, not shown, is firmly secured to a lever 1302 which has a pair of arms 1304 1306 on either side thereof. Arms 1304 and 1306 have apertures therein for receiving a rod 1308 about which lever 1302 is adapted to pivot. A spring control member 1310 has one end 1312 secured to a casing for the valve, not shown, by means of a screw 1314 and another end 1316 extending under the upper portion of lever 1302.

A heating element 1318 is disposed in proximity to spring control member 1310 and has a pair of leads 1320 and 1322 which extend through the valve casing and are adapted to be connected to a suitable source of electricity.

Spring control member 1310 is a torsion spring having a loosely coiled high torsion initial shape and tightly coiled low torsion distorted shape such that upon reversion to the initial shape spring control member 1310 will rotate clockwise.

In order to open the valve of the embodiment of FIG. 17, electricity is supplied to leads 1322 and 1324 to energize heating element 1320. The heat generated by heat element 1320 raises the temperature sensed by spring control member 1318 above the transition temperature to increase the modulus of elasticity. Once the modulus of elasticity increases to a point where the load constituted by the force of a bias spring, not shown, and the weight of valve member 1300 and lever 1302 is insufficient to distort spring control member 1318 to the extent required to maintain valve member 1300 in its closed position, as illustrated in FIG. 17, spring control member 1310 will rotate clockwise to revert to its initial loosely coiled shape and rotate lever 1302 clockwise to open the valve. If the temperature sensed by spring control member 1310 drops, or the spring control member breaks or sets, the valve will close to provide fail-safe operation.

To close the valve the electricity supplied to terminals 1322 and 1324 is interrupted to lower the temperature of spring control member 1318. The cooling of spring control member 1318 decreases the modulus of elasticity until the force from the bias spring and the weight of valve member 1300 and lever 1302 are sufficient to rotate spring control member 1310 counterclockwise to its tightly coiled distorted shape to close the valve.

Another embodiment of the present invention is illustrated in FIG. 18 and includes a casing 1400 for a valve assembly having an inlet 1402, an outlet 1404 and an annular valve seat 1406 disposed therebetween. A valve member 1408 is movably disposed for cooperation with valve seat 1406 to control fluidic flow through casing 1400. A bias spring 1410 is torsionally mounted between a bottom wall of casing 1400 and a valve stem 1412 secured to valve member 1408. Valve stem 1412 has an aperture through the end thereof for receiving a torsion control member 1414 which is seated in the bottom wall of valve casing 1400 and extends through an upper wall in casing 1400. A cylindrical housing 1416 is sealably connected with casing 1400 to receive and secure the upper portion of torsion control member 1414. A heating element 1418 is coiled around housing 1416 and has a pair of leads 1420 and 1422 adapted to be connected to a suitable source of electricity.

The embodiment of FIG 18 is illustrated with the valve in the closed condition and torsion control member 1414 in its twisted low torsion distorted shape. In the initial shape torsion control member 1414 is twisted with high torsion such that valve member 1408 is rotated away from valve seated 1406. Thus, when it is desired to open the valve, electricity is applied to leads 1420 and 1422 to energize heating element 1418 and increase the modulus of elasticity of torsion control member 1414 until the force of bias spring 1410 is overcome to rotate valve member 1408 away from valve seat 1406.

To close the valve the electricity supplied to leads 1420 and 1422 is interrupted to lower the temperature sensed by torsion control member 1414. The cooling of torsion control member 1414 decreases the modulus of elasticity until the force from spring 1410 is sufficient to change torsion control member 1414 to its distorted shape to close the valve.

The embodiment of FIG. 18 has the advantages, previously mentioned with respect to the embodiment of FIG. 4, concomitant with external heaters and is independent of electrical characteristics of the torsion control member. The valve assembly is fail-safe since torsion control member 1414 will return to its distorted shape to close the valve if the electricity should be interrupted and the valve will be closed by bias spring 1410 if torsion control member 1414 should break or set.

A further embodiment of the present invention is illustrated in FIG. 19 and includes a casing 1500 for a valve assembly having an inlet 1502, an outlet 1504 and an annular valve seat 1506 disposed therebetween. A valve member 1508 is movably disposed for cooperation with valve seat 1506 to control fluidic flow through casing 1500. A bar control member 1510 has one end rigidly secured to a sidewall of casing 1500 by a screw and a free end secured to valve member 1508. A blade spring 1512 has one end rigidly secured to the sidewall of casing 1500 by the screw and an offset end adapted to engage bar control member 1510 to bias valve member 1508 toward valve seat 1506. A heating element 1514 is coiled around bar control member 1510 and is connected to a pair of electrical terminals 1516 and 1518 which extend through gastight seals in an upper wall of valve casing 1500 through leads 1520 and 1522, respectively.

The embodiment of FIG. 19 is illustrated with the valve in its closed condition an bar control member 1510 in its distorted shape. In its initial shape bar control member 1510 is curved upward so as to lift valve member 1508 from valve seat 1506. Thus, in order to open the valve electricity is applied to terminals 1516 and 1518 to energize heating element 1514. The heat generated by heating element 1514 causes bar control member 1510 to revert to its initial shape once the modulus of elasticity is increased to a point where the load constituted by the force of spring 1512 and the weight of valve member 1508 is insufficient to distort bar control member 1510 to the extend required to maintain valve member 1508 in its closed position. If bar control member 1510 should break or set or if the electricity should be interrupted, bias spring 1512 will force valve member 1508 into engagement with valve seat 1506 to close the valve and provide fail-safe operation.

To close the valve the electricity supplied to terminals 1516 and 1518 is interrupted which lowers the temperature of bar control member 1510. The cooling of bar control member 1510 decreases the modulus of elasticity until the force from spring 1512 and the weight from valve member 1508 are sufficient to change the bar control member 1510 to its linear distorted shape to close the valve.

Bar control member 1510 may have any desired cross section and may be formed with a linear initial shape and curved distorted shape by raising the stationary end of bar control member 1510 or otherwise modifying the illustrated structure.

The embodiments of FIGS. 17, 18 and 19 illustrate the varied configurations of control members that may be utilized when auxiliary heating elements are employed. It is noted, however, that current could be passed through the control members of FIGS. 17, 18 and 19 with the requirement that proper electrical characteristics are presented.

The control members illustrated in the above identified embodiments are not meant to be the only shapes, configurations and cross sections of control members that can be utilized with the present invention. Almost any form of control member can be utilized as long as it will deflect with a load, such as a spring, and can be heated by current or any auxiliary heating element.

The control members for the embodiments above described may be formed by annealing the material in a desired shape in a position that will effect valve opening. The annealing step may be performed in the valve assembly or external of the valve assembly. After annealing, which may be accomplished by passing a current through the control member, and adjusting the annealed control member, a force is applied to the control member below the transition temperature to stretch and stabilize the control member. The control member is then cycled through its distorted and initial shapes, and the valve assembly is ready for operation.

For protection against ambient temperatures rising above the transition temperature of the temperature-actuated shape memory material, a fuse link may be assembled with the control member such that the fuse link will melt at high ambient temperatures. Thus, undersired opening of a valve is prevented and fail-safe operation is assured.

In as much as the present invention is subject to many variations, modifications and changes in detail, it is intended that all matter described in the foregoing specification or shown in the accompanying drawings shall be interpreted as illustrative and not in a limiting sense.

What is claimed is:

1. In a valve assembly, the combination comprising
    a valve member having a first position and a second position;
    means biasing said valve member toward said first position; and
    operating means connected with said valve member to control the position of said valve member, said operating means including a control member constructed of a material having a temperature-actuated shape memory characterized by a nonlinear modulus of elasticity vs. temperature curve and having an initial shape above a predetermined transition temperature, being deformable to a distorted shape below said transition temperature, and rapidly reverting to said initial shape upon being heated above said transition temperature as a result of said nonlinear temperature-actuated shape memory, said valve member being in said first position when said control member has said distorted shape and in said second position when said control member has said initial shape, said biasing means being connected with said control member to deform the same to said distorted shape below said transition temperature, and means controlling the temperature of said control member to control the shape thereof whereby said valve member may be rapidly moved between said open and closed positions for precise control of flow therethrough.

2. The invention as recited in claim 1 wherein said control member is a wire.

3. The invention as recited in claim 1 wherein said control member is a double strand wire.

4. The invention as recited in claim 1 wherein said control member is a spring.

5. The invention as recited in claim 4 wherein said spring is coiled.

6. The invention as recited in claim 5 wherein said coiled spring is mounted in compression and has loosely coiled initial shape and a tightly coiled distorted shape.

7. The invention as recited in claim 6 wherein said coiled spring has a barrel like configuration.

8. The invention as recited in claim 5 wherein said coiled spring is torsionally mounted and has a loosely coiled initial shape and a tightly coiled distorted shape.

9. The invention as recited in claim 5 wherein said coiled spring is mounted in tension and has a tightly coiled initial shape and a loosely coiled distorted shape.

10. The invention as recited in claim 5 wherein said coiled spring has a high torsion initial shape and a low torsion distorted shape.

11. The invention as recited in claim 1 wherein said control member is a bar having high torsion initial shape and a low torsion distorted shape.

12. The invention as recited in claim 1 wherein said control member is a bar having a linear initial shape and a curved distorted shape.

13. The invention as recited in claim wherein said control member is a bar having a curved initial shape and a linear distorted shape.

14. The invention as recited in claim 1 wherein said operating means includes lever means connected with said valve member and said control member whereby said lever means controls said valve member in accordance with the shape of said control member.

15. The invention as recited in claim 1 wherein said control member is connected directly with said valve member.

16. The invention as recited in claim 1 wherein said temperature-controlling means includes a heating element disposed adjacent said control member.

17. The invention as recited in claim 1 wherein said temperature-controlling means includes electrical means connected with said control member to pass an electrical current through said control member to internally heat said control member.

18. The invention as recited in claim 1 wherein said material is an alloy having a composition of 55 percent nickel by weight with the remainder being essentially titanium.

19. The invention as recited in claim 1 wherein the valve assembly includes a valve seat, said valve member engages the valve seat in said first position to close the valve assembly and is removed from the valve seat in said second position to open the valve assembly and said temperature-controlling means provides heat to change said control member from said distorted shape to said initial shape to open the valve assembly whereby the valve assembly will close to provide fail-safe operation if said control member fails or if the heat from said temperature-controlling means is interrupted.

20. The invention as recited in claim 1 wherein said control member is a wire having a first end and a second end, the valve assembly includes a housing surrounding said wire, and said operating means includes means securing said first end of said wire to said housing and means securing said second end of said wire to said valve member the distance between said first end of said wire and said second end of said wire being greater when said wire has said distorted shape than when said wire has said initial shape.

21. The invention as recited in claim 20 wherein said temperature-controlling means includes a heating element disposed around said wire.

22. The invention as recited in claim 21 wherein said heating element is disposed inside said housing.

23. The invention as recited in claim 21 wherein said heating element is disposed outside said housing.

24. The invention as recited in claim 21 wherein said bias means includes a coiled spring coaxially aligned with said wire and seated on said valve member.

25. The invention as recited in claim 1 wherein said control member is a wire and said temperature-controlling means includes electrical means connected with said wire to pass an electrical current through said wire to internally heat said wire.

26. The invention as recited in claim 25 wherein said valve member is adapted to engage a first valve seat in said first position and a second valve seat in said second position and said wire has a first end connected with said valve member and a second end connected with said electrical means, the distance between said first end of said wire and said second end of said wire being less when said wire has said initial shape than when said wire has said distorted shape whereby said valve member engages the second valve seat when said wire has said initial shape.

27. The invention as recited in claim 25 wherein said wire has a bent center portion to define first and second lengths for said wire.

28. The invention as recited in claim 27 wherein said electrical means includes a first terminal connected with said first length of said wire and a second terminal connected with said second length of said wire.

29. The invention as recited in claim 28 wherein said operating means includes a lever secured to said valve member and having an aperture through which said central portion of said wire moves freely.

30. The invention as recited in claim 29 wherein said aperture is disposed directly above said valve member.

31. The invention as recited in claim 29 wherein said lever has an arm acutely extending therefrom, said aperture being disposed on said arm.

32. The invention as recited in claim 29 wherein said bias means includes a coiled spring seated on said lever.

33. The invention as recited in claim 1 wherein said control member is a coiled spring and said operating means includes seat means receiving said coiled spring and said bias means.

34. The invention as recited in claim 33 wherein said coiled spring is mounted in compression and has a loosely coiled initial shape and a tightly coiled distorted shape.

35. The invention as recited in claim 34 wherein said coiled spring has a barrel like configuration.

36. The invention as recited in claim 34 wherein said temperature-controlling means includes electrical means connected with said coiled spring to pass an electrical current through said coiled spring to internally heat said coiled spring.

37. The invention as recited in claim 33 wherein said seat means includes a cylinder having an inner portion, a top portion and an outer flange, said valve member is connected with said cylinder, said bias means is seated on said outer flange, and said coiled spring is disposed in said inner portion in compression against said top portion of said cylinder.

38. The invention as recited in claim 37 wherein said seat means includes a stationary housing for mounting said coiled spring in compression along with said top portion of said cylinder.

39. The invention as recited in claim 38 wherein said bias means includes a helical spring seated on said outer flange of said cylinder.

40. The invention as recited in claim 33 wherein said seat means includes a cylinder fastened to said valve member and including an inner flange and an outer flange, said bias means is seated on said inner flange and said coiled spring is mounted in compression against said outer flange of said cylinder.

41. The invention as recited in claim 40 wherein said bias means includes a helical spring seated on said inner flange of said cylinder.

42. The invention as recited in claim 1 wherein said control member is a coiled spring and said operating means includes lever means connected with said valve member.

43. The invention as recited in claim 42 wherein said coiled spring is mounted in compression and has a loosely coiled initial shape and a tightly coiled distorted shape.

44. The invention as recited in claim 43 wherein said coiled spring has a barrel like configuration.

45. The invention as recited in claim 42 wherein said temperature-controlling means includes electrical means connected with said coiled spring to pass an electrical current through said coiled spring to internally heat said coiled spring.

46. The invention as recited in claim 42 wherein said lever means has a first end secured to a fulcrum, a second end mounting said coiled spring in compression and a center portion secured to said valve member, and said bias means is mounted in compression against said center portion of said lever means.

47. The invention as recited in claim 42 wherein said lever means has a first end mounting said coiled spring in compression, a second end secured to said valve member and a center portion secured to a fulcrum, and said bias means is mounted in compression against said second end of said lever means.

48. The invention as recited in claim 1 wherein said valve member has a first side adapted to engage a first valve seat in said first position and a second side adapted to engage a second valve seat in said second position, said bias means is mounted in compression against said first side of said valve member, and said control member includes a coiled spring mounted in compression against said second side of said valve member.

49. The invention as recited in claim 48 wherein said operating means includes means pivotally supporting said valve member.

50. The invention as recited in claim 48 wherein said temperature-controlling means includes electrical means connected with said coiled spring to pass an electrical current through said coiled spring to heat said coiled spring.

51. The invention as recited in claim 1 wherein said control member is a coiled spring mounted in tension and having a tightly coiled initial shape and a loosely coiled distorted shape, said coiled spring being connected directly with said valve member.

52. The invention as recited in claim 51 wherein said temperature-controlling means includes electrical means connected with said coiled spring to pass an electrical current through said coiled spring to heat said coiled spring.

53. The invention as recited in claim 1 wherein said control member is a coiled spring mounted in tension and having a tightly coiled initial shape and a loosely coiled distorted shape, and said operating means includes lever means secured to said valve member, coiled spring being connected with said lever means.

54. The invention as recited in claim 53 wherein said temperature-controlling means includes electrical means connected with said coiled spring to pass an electrical current through said coiled spring to heat said coiled spring.

55. The invention as recited in claim 1 wherein said control member is a torsion spring having a high torsion initial shape and a low torsion distorted shape, and said operating means includes lever means connected with said torsion spring and secured to said valve member.

56. The invention as recited in claim 55 wherein said torsion spring is coiled and has a first stationary end and a second end connected with said lever means, said operating means includes means pivotally supporting said lever means whereby said lever means is pivoted to control the position of said valve member in accordance with the shape of said coiled torsion spring.

57. The invention recited in claim 56 wherein said temperature-controlling means includes an electrical heating element disposed adjacent said coiled torsion spring.

58. The invention as recited in claim 1 wherein said control member is a torsion bar having a high torsion initial shape and a low torsion distorted shape, and said operating means includes means connecting said valve member with said torsion bar whereby said valve member is rotatably movable between said first and second positions.

59. The invention as recited in claim 58 wherein said temperature-controlling means includes an electrical heating element disposed around said torsion bar.

60. The invention as recited in claim 1 wherein said control member is secured to said valve member and has a curved initial shape and a linear distorted shape.

61. The invention as recited in claim 60 wherein said temperature-controlling means includes an electrical heating element disposed around said control member.

62. The invention as recited in claim 1 wherein said control member is a wire and said operating means includes means for adjusting the effective length of said wire.